June 17, 1924.

G. W. WELLS 1,498,499

SHEET METAL CUTTING MACHINE

Filed Aug. 1, 1923

4 Sheets-Sheet 1

Inventor.
Geo. W. Wells,
By E. D. Anderson &on
Attorneys.

June 17, 1924.

G. W. WELLS 1,498,499

SHEET METAL CUTTING MACHINE

Filed Aug. 1, 1923

4 Sheets-Sheet 2

Inventor
Geo. W. Wells,
By E. W. Anderson & Son.
Attorneys.

June 17, 1924.

G. W. WELLS

SHEET METAL CUTTING MACHINE

Filed Aug. 1, 1923

1,498,499

4 Sheets-Sheet 3

Inventor.
Geo. W. Wells,
By E.W. Anderson Son.
Attorneys.

Patented June 17, 1924.

1,498,499

UNITED STATES PATENT OFFICE.

GEORGE W. WELLS, OF AMESBURY, MASSACHUSETTS, ASSIGNOR TO WALKER BODY COMPANY, OF AMESBURY, MASSACHUSETTS, A CORPORATION OF MASSACHUSETTS.

SHEET-METAL-CUTTING MACHINE.

Application filed August 1, 1923. Serial No. 655,124.

*To all whom it may concern:*

Be it known that I, GEORGE W. WELLS, a citizen of the United States, residing at Amesbury, in the county of Essex and State of Massachusetts, have made a certain new and useful Invention in Sheet-Metal-Cutting Machines, of which the following is a specification.

This invention has relation to sheet metal cutting machines, having for an object to provide a machine capable of cutting sheet metal with a comparatively smooth edge cut requiring little finishing, and especially adapted for cutting the metal in pattern form, and for cutting central parts from the metal leaving the margin or edge portion untouched. Other objects and advantages will appear.

The invention consists in the novel construction and combinations of parts, as set forth in the appended claims.

Figure 1:
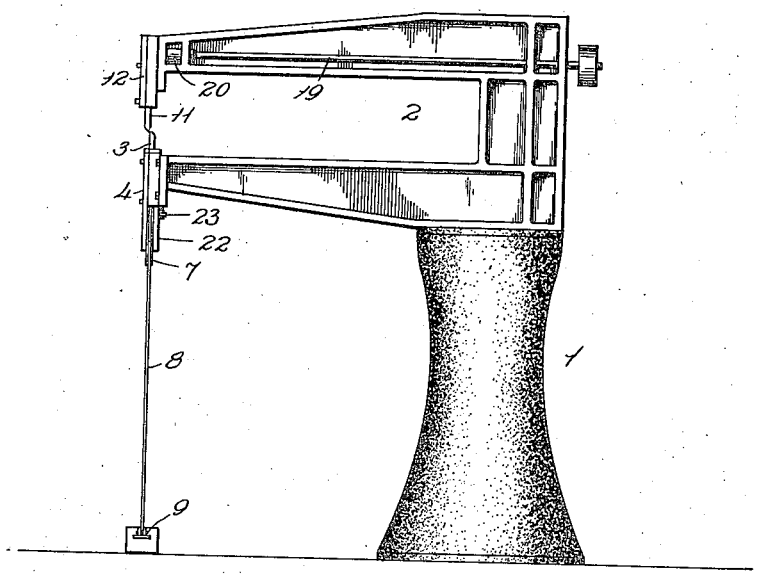
Figure 8:
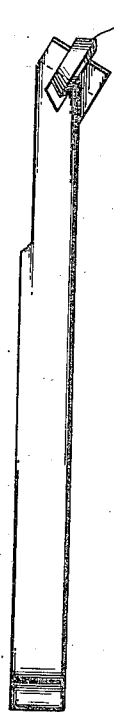
Figure 9:
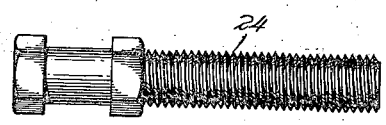
Figure 2:
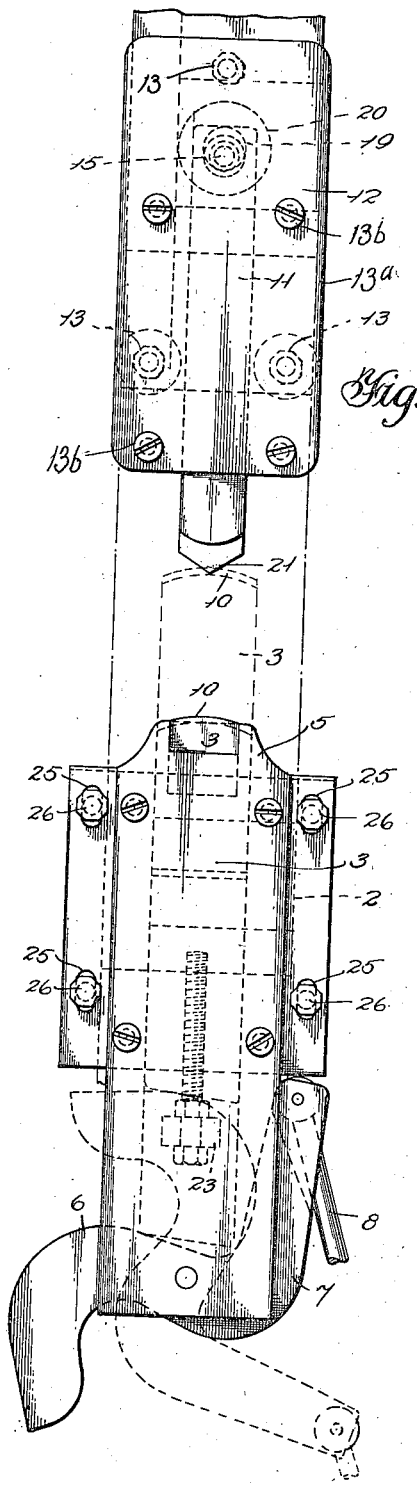
Figure 3:
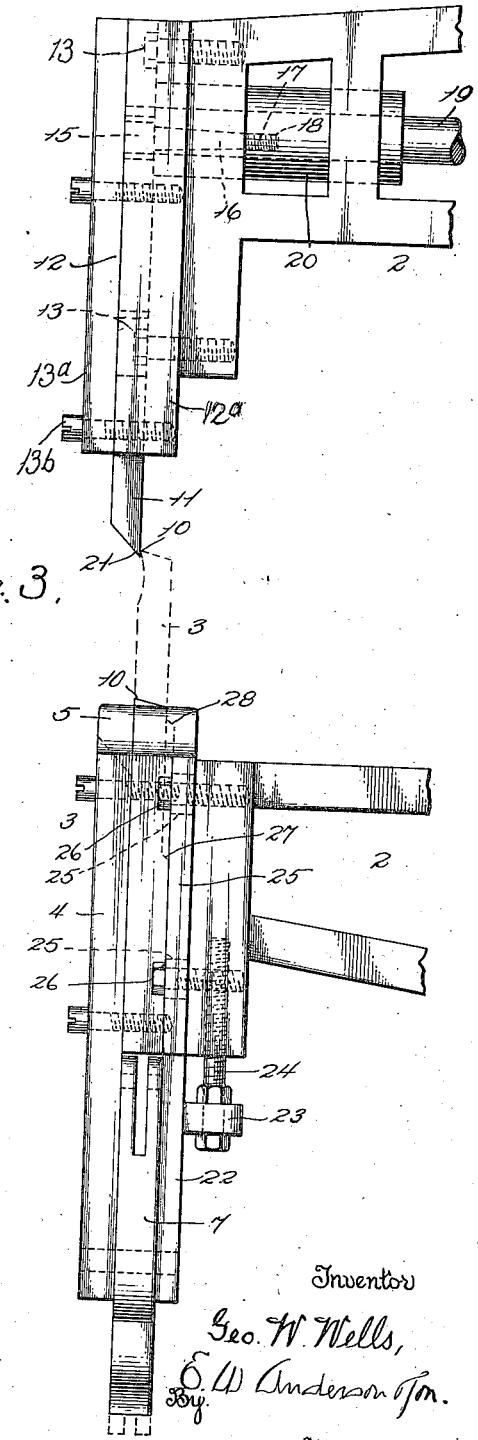
Figure 4:
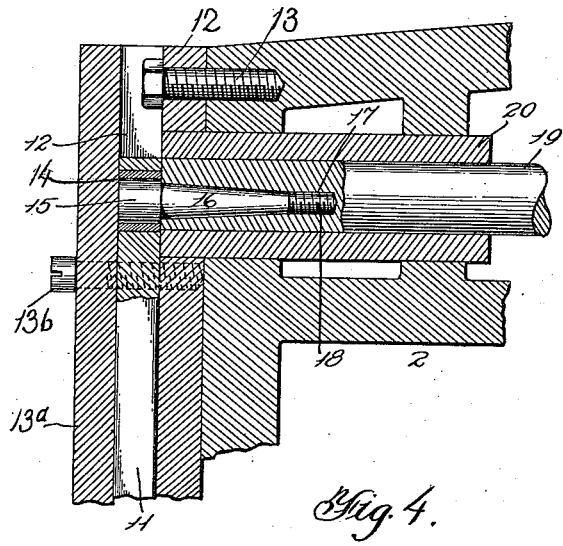
Figure 5:
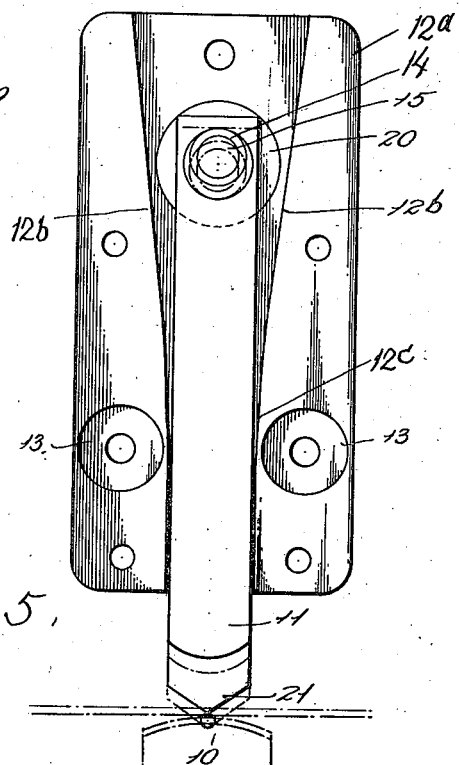
Figure 6:
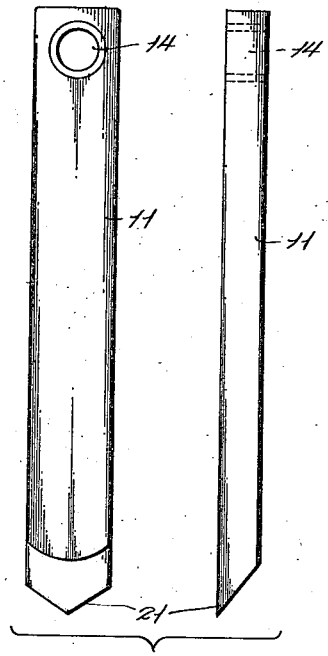
Figure 7:
Figure 10:
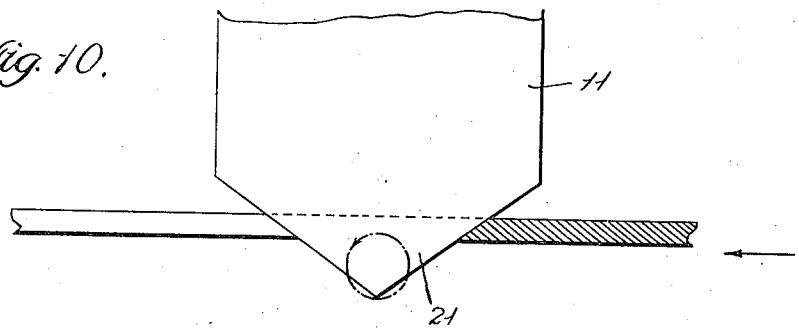
Figure 11:
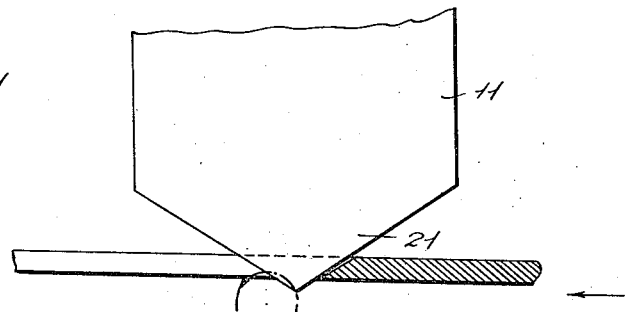
Figure 12:
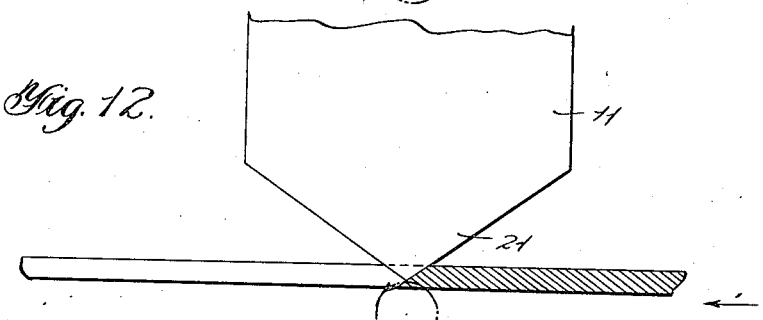
Figure 13:
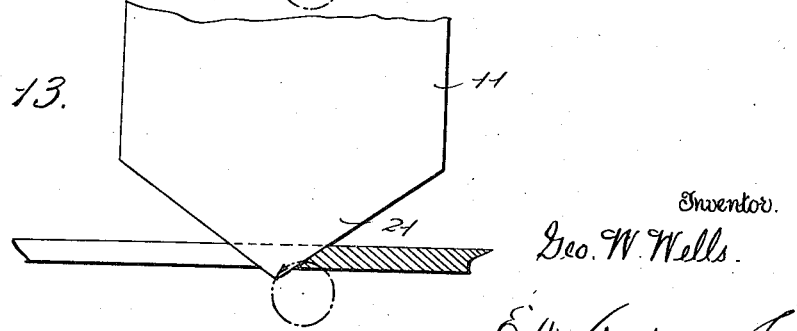

In the accompanying drawings, illustrating an embodiment of the invention, Figure 1 is a side view of the invention; Figure 2 is a face view of the upper and lower cutter devices, showing the lower cutter raised in dotted lines; Figure 3 is a side view of the same; Figure 4 is a fragmentary section on the line 4—4, Figure 5; Figure 5 is a face view of the upper cutter device (with lower cutter shown in dotted lines) front plate being removed; and the lowermost position of the upper cutter being shown in dotted lines, the path of travel of the point of the upper cutter being shown diagrammatically as a circle; Figure 6 shows detail face and side views of the upper cutter blade; Figure 7 is a detail side view of the pivot bolt; Figure 8 is a detail side view of a modified form of lower cutter; Figure 9 is a detailed side view of the adjustable vertical bolt; Figures 10, 11, 12 and 13 are fragmentary diagrammatic face views of the upper cutter blade, in engagement with the sheet metal being cut, in four positions of the cycle of operation, Figure 12 showing first position at start, Figure 13 showing second position approaching end of first quarter, Figure 10 third position at end of second quarter, and Figure 11 fourth position just past completion of third quarter.

In these drawings the numeral 1 designates the pedestal or base, supporting the horizontal frame 2, having upper and lower horizontally spaced portions, at the free ends of which the cutting devices are mounted and work.

The lower jaw 3 of the cutting device works vertically in a guide way 4, being normal through force of gravity in a lowered position in said guideway, shown in Figure 2 of the drawings, with its upper cutting edge projecting slightly above the lateral beveled projections 5 at the sides of the top of said guideway. This lower jaw or blade in said lowered position rests upon the cam portion 6 of a lever 7, having a connecting rod 8 to a pedal lever 9, whereby the operation of the cam lever will raise said lower jaw or blade to the position shown in Figure 1 with the work previously placed thereon, this work now being supported upon the center of the horizontally arched or curved cutting edge 10 of said blade and being so held by the operator.

The upper jaw or blade 11 of the cutting device works in a vertical guideway 12 of a back plate 12$^a$, secured to the framing by screws 13, said guideway having downwardly converging side walls 12$^b$, and a lower contracted portion 12$^c$, said blade having an upper perforation 14, engaged by the head 15 of a horizontal pivot bolt 16, said bolt being threaded at 17 in an aperture 18, bored horizontally and eccentrically of a horizontal operating shaft 19, said shaft having journal bearings in a horizontal sleeve 20 of the framing, the result being that rotation of said shaft will cause the lower cutting edge of said upper jaw to describe an approximately circular rocking or slicing path, first forwardly and then backwardly or in two directions, the jaw rocking in the lower contracted portion of said guideway in its vertical reciprocation in describing said path. The guideway 12 is closed forwardly by a front plate 13$^a$, secured to the back plate by screws 13$^b$.

The cutting edge 21 of the upper jaw is provided with a double incline, meeting at the center of the edge, and the stroke of said jaw is short, being about three sixteenths of an inch.

Means are provided to limit the upward movement of the lower cutter blade or jaw in the operation of the treadle device, whereby said blade in its elevated position will properly cooperate with the upper cutter in cutting sheet metal of varying thicknesses, the adjustment being gaged for the special thickness of the metal being cut, so that the upper cutter in its slicing movement stated shall never leave the work, the latter being fed forwardly by the operator, whereby in conjunction with the short stroke of the upper jaw, a continuous and even cut of the metal is assured, succeeding cuts intersecting without break in cutting patterns and curves, and enabling central parts to be cut from the metal, leaving the marginal or edge portions untouched.

The upper cutter having a double incline from the middle of its cutting edge provides for a blunter point not so easily injured.

It is designed that the thickness of the metal being cut shall preferably be such that that first half of the downward stroke of the upper jaw, being the forward slicing movement thereof, shall complete the cutting through the metal, the reverse slicing movement of the upper jaw in the last half of the downward movement thereof, being also active in effecting a cutting of the metal provided the operator feeds the work at that time, the feeding of the work by the operator being assisted by the forward slicing movement of the cutter in said first half of the downward stroke.

The means for limiting the upward movement of the lower cutter in the operation of the treadle and hereinbefore referred to consists of a back plate 22, including the aforesaid guideway 4 for the lower cutter, said plate having a rear lug 23, provided with an adjustable vertical bolt connection 24 with the framing, and having lateral flanges provided with vertical slots 25, engaged by adjustable screws 26, extended into the framing. The lower cutter blade or jaw 3 is provided with a lateral shoulder 27, which at the limit of the upward movement thereof engages a shoulder 28 of the aforesaid back plate, and the latter being vertically adjusted as stated, by loosening the screws or bolts, making the adjustment and tightening the screws, the shoulder 28 will be similarly adjusted and the lower cutter blade or jaw will contact with the shoulder of the plate 28 at a greater or less elevation as the case may be.

The lower cutter blade or jaw shown mainly may be substituted by the modification shown in Figure 8 of the drawings, wherein this jaw is provided with a rolling cutter 3'.

I claim:—

1. In a sheet metal cutting machine, a lower stationary cutter, an upper cutter cooperating therewith, and means for operating said upper cutter to cause its cutting edge to travel in an endless path and to assist in the feeding of the work simultaneously with the cutting thereof.

2. In a sheet metal cutting machine, a lower stationary cutter, an upper cutter cooperating therewith and having a double inclined cutting edge the inclines of which intersect at the center of said edge, and means for operating said upper cutter to cause its cutting edge to travel in an endless path in the plane of said edge and to assist in the feeding of the work.

3. In a sheet metal cutting machine, a lower stationary cutter, an upper cutter cooperating therewith, and means for operating the upper cutter to cause its cutting edge to travel in an endless path and to have a slicing action during the effective portion of the stroke.

4. In a sheet metal cutting machine, a lower cutter, an upper cutter cooperating therewith, and means for operating the upper cutter to cause its cutting edge to travel in an endless path in the plane of said edge and to have a slicing action in two directions of movement.

5. In a sheet metal cutting machine, a lower cutter, an upper cutter cooperating therewith, and means for operating the upper cutter to cause its cutting edge to travel in an endless path in the plane of said edge and to complete the cutting through the work in the first half of its downward movement.

6. In a sheet metal cutting machine, a lower cutter, an upper cutter cooperating therewith, and means for operating the upper cutter to cause its cutting edge to travel in an endless path in the plane of said edge and to complete the cutting through the work in the first half of its downward movement, and during the second half of said downward movement to make a succeeding cut.

7. In a sheet metal cutting machine, a lower stationary cutter, and an upper cutter cooperating therewith and adapted to have its cutting edge travel in an endless path, framing having a slideway wherein said upper cutter works and provided with bearings intermediately of its length whereon said cutter is adapted to rock, and an upper eccentric operating connection for the upper cutter.

8. In a sheet metal cutting machine, upper and lower horizontally spaced supports provided with vertical guideways at their free ends, the lower guideway having opposite beveled lugs at the top thereof and the upper guideway having bearings intermediately of its length, a lower stationary cutter normally depressed in the lower guideway and having a curved cutting edge projecting slightly above said lugs, a treadle device for raising the lower cutter and the work therewith, and an upper cutter adapted to have its cutting edge travel in an endless path and having a rocking movement upon said bearings.

9. In a sheet metal cutting machine, upper and lower horizontally spaced supports provided with vertical guideways at their free ends, the lower guideway having opposite beveled lugs at the top thereof, pedal controlled means for raising the lower cutter and the work therewith, and an upper cutter adapted to have its cutting edge travel in an endless path, said pedal controlled means being adapted for instant release to stop the operation of the machine.

10. In a sheet metal cutting machine, a lower stationary cutter, means for raising the same and the work therewith at will, and an upper cutter adapted to have its cutting edge travel in an endless path, the means for raising the lower cutter and the work being adapted for instant release to stop the operation of the machine.

11. In a sheet metal cutting machine, a lower cutter, and an upper cutter cooperating therewith and adapted to have its cutting edge travel in an endless path in the plane of said edge, an effective portion of the said path being of a forward slicing nature assisting in the feeding of the work, and means for raising the lower cutter and the work at will adapted for instant release to stop the operation of the machine.

In testimony whereof I affix my signature.

GEORGE W. WELLS.